(12) United States Patent
Wang et al.

(10) Patent No.: US 10,543,783 B1
(45) Date of Patent: Jan. 28, 2020

(54) VEHICLE HAVING POSITIONABLE VIDEO CAMERA

(71) Applicants: Jinjun Wang, Cypress, TX (US);
Xiaomin Shen, Cypress, TX (US)

(72) Inventors: Jinjun Wang, Cypress, TX (US);
Xiaomin Shen, Cypress, TX (US)

( * ) Notice: Subject to any disclaimer, the term of this patent is extended or adjusted under 35 U.S.C. 154(b) by 0 days.

(21) Appl. No.: 16/163,423

(22) Filed: Oct. 17, 2018

(51) Int. Cl.
*H04N 7/18* (2006.01)
*B60R 1/00* (2006.01)
*B60R 11/04* (2006.01)
*H04N 5/232* (2006.01)

(52) U.S. Cl.
CPC ............. *B60R 1/00* (2013.01); *B60R 11/04* (2013.01); *H04N 5/23299* (2018.08); *B60R 2300/602* (2013.01); *B60R 2300/806* (2013.01); *H04N 5/23203* (2013.01)

(58) Field of Classification Search
CPC ..... B60R 1/00; B60R 11/04; B60R 2300/602; B60R 2300/806; H04N 5/23299; H04N 5/23203
See application file for complete search history.

(56) References Cited

U.S. PATENT DOCUMENTS

2018/0001836 A1* 1/2018 Pan .......................... B60R 1/00

* cited by examiner

*Primary Examiner* — Howard D Brown, Jr.
(74) *Attorney, Agent, or Firm* — Gulf Coast Intellectual Property Group

(57) ABSTRACT

A vehicle having at least one camera wherein the at least one camera is configured to provide an improved view for the driver of the vehicle. The vehicle includes a body having a camera mount operably coupled therewith. The camera mount is operably coupled to the vehicle in a first technique or a second technique. The camera mount has secured to the second end thereof a camera. The camera mount is movable intermediate a first position and a second position. In the second position of the camera mount the camera secured to the second end thereof is positioned such that the camera is above the roof of the vehicle. A drive motor and transmission mechanism is provided to offer operation of the camera mount so as to move intermediate its first position and second position. A display and controller are disposed within the passenger compartment of the vehicle.

16 Claims, 3 Drawing Sheets

VEHICLE HAVING POSITIONABLE VIDEO CAMERA

FIELD OF THE INVENTION

The present invention relates generally to vehicular safety and convenience, more specifically but not by way of limitation, a vehicle that has at least one video camera wherein the video camera is movably mounted to the vehicle so as to extend thereabove and provide improved visibility over the crest of a steep hill or other obstruction or locate a target such as but not limited to a parking lot.

BACKGROUND

Vehicular safety has greatly improved with utilization of technology over the last several decades. Implementation of computerized systems and various electronics have resulted in safety features for vehicles such as but not limited to parking sensors and lane departure detection. One feature that has become increasingly popular over the last decade is a rear back-up camera. In the United States by 2020 all new vehicles produced will be required to have a rear back-up camera. As is known in the art, rear back-up cameras provide improved visibility in the area behind the vehicle while the car is being reversed. Alternatively, some of these cameras can be turned on while moving forward as well. The improved visibility provided by the rear view camera allows a driver to see an obstacle that might otherwise have gone undetected. Additional camera technology has also been deployed wherein side cameras are being utilized to broaden the area that is visible in the camera around the vehicle.

One problem with existing camera technology in vehicles is their view is restricted to the immediate adjacent area to the vehicle and a view that is restricted by obstructions. Both the rear view cameras and the side cameras only provide a view of an area that is approximately within 20 feet of the camera and is level with the vehicle. These cameras are unable to be adjusted to change the view angle or to be able to better identify situations over an obstruction, or locate targets from a further distance.

Accordingly, there is a need for a vehicle that has at least one camera wherein the camera is positionable so as to alter the view angle thereof wherein the camera view angle is above the roof line of the vehicle.

SUMMARY OF THE INVENTION

It is the object of the present invention to provide a vehicle configured to provide an improved view of a portion of a road wherein the vehicle includes at least one camera movably mounted to the vehicle body.

Another object of the present invention is to provide a vehicle operable to provide a driver thereof improved visibility wherein the at least one camera is operably coupled to a display in the passenger compartment of the vehicle.

A further object of the present invention is to provide a vehicle configured to provide an improved view of a portion of a road wherein the vehicle includes a movable camera mount that is configured to have a camera secured to the distal end thereof.

Still another object of the present invention is to provide a vehicle operable to provide a driver thereof improved visibility of a road forward of the location of the vehicle wherein the camera mount is configured to extend above the roof line of the vehicle.

An additional object of the present invention is to provide a vehicle configured to provide an improved view of a portion of a road wherein in one embodiment the vehicle includes a channel formed in the body thereof that provides a location for the camera mount in a first position.

Yet a further object of the present invention is to provide a vehicle operable to provide a driver thereof improved visibility of a road forward, rearward or laterally of the location of the vehicle wherein the camera mount has a drive motor operably coupled thereto.

Another object of the present invention is to provide a vehicle configured to offer an improved view of a portion of a road wherein the at least one camera is operably coupled to the display utilizing a wired or wireless connection.

An alternate object of the present invention is to provide a vehicle operable to provide a driver thereof improved visibility of a road forward or rearward of the location of the vehicle wherein the at least one camera is operably coupled to a controller that is configured to provide an operational interface for the camera.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
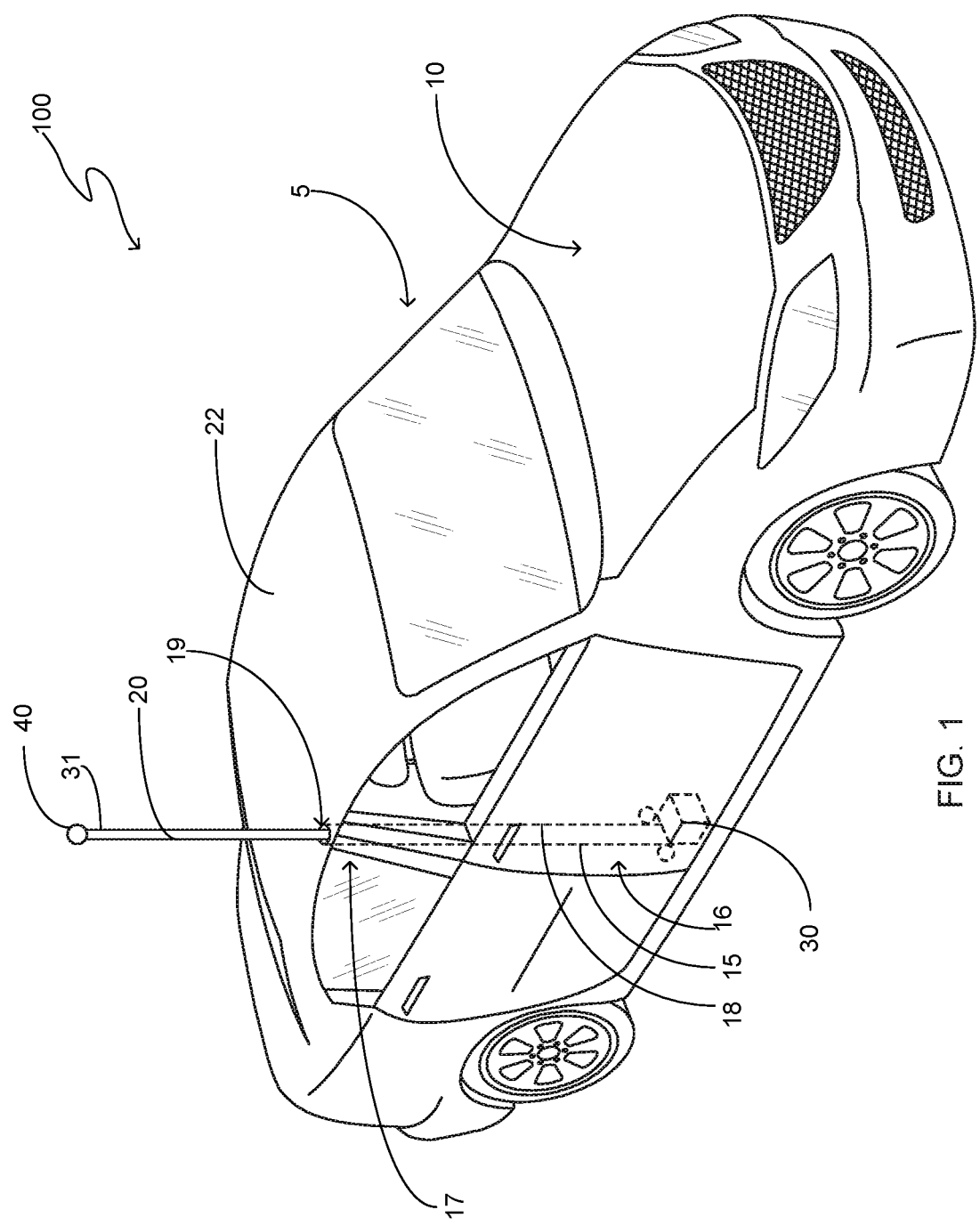
FIG. 1 is a perspective view of an embodiment of the present invention.

Referring now to the drawings submitted herewith, wherein various elements depicted therein are not necessarily drawn to scale and wherein through the views and figures like elements are referenced with identical reference numerals, there is illustrated a vehicle with positionable video camera 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 herein, the vehicle with positionable video camera 100 includes a vehicle body 10 that is manufactured utilizing suitable techniques. While the vehicle body 10 is illustrated herein as being a four door sedan, it is contemplated within the scope of the present invention that the vehicle body 10 could be any type of passenger vehicle such as but not limited to a truck, SUV or two door coupe. The vehicle body 10 illustrated herein is for exemplary purposes herein and it should be understood that the vehicle 5 is a conventional operating automobile suitable for use on roads, highways and off-road conditions.

The vehicle body 10 includes a mounting channel 15. The mounting channel 15 is formed in the vehicle body 10 utilizing suitable techniques and is of sufficient length to accommodate the camera mount 20 therein when the camera mount 20 is in its first position as is further discussed herein. The mounting channel 15 includes a first end 16 and second end 17 wherein the second end 17 has an opening 19 with moisture seal providing access to the interior volume 18 of the mounting channel 15. The first end 16 of the mounting channel 15 is proximate the floor of the vehicle body 10 and the second end 17 is proximate the roof 22 of the vehicle body 10. While the mounting channel 15 is illustrated herein as being intermediate the front door and rear door of the vehicle body 10, it is contemplated within the scope of the present invention that the mounting channel 15 could be positioned in alternate locations dependent upon the type of vehicle 5. It is further contemplated within the scope of the present invention that the mounting channel 15 could be manufactured in alternate lengths in order to accommodate therein a camera mount 20 of different sizes.

Operably coupled to the camera mount 20 is a drive motor and transmission mechanism 30. The drive motor and transmission mechanism 30 is configured to provide movement of the camera mount 20 intermediate a first position and a second position. It is contemplated within the scope of the present invention that the drive motor and transmission mechanism 30 could be a conventional motor such as but not limited to an electric motor or a hydraulic motor so as to accomplish the desired functionality of moving the camera mount 20 intermediate its first position and its second position. In its first position the camera mount 20 is completely disposed within the interior volume 18 of the mounting channel 15. The drive motor and transmission mechanism 30 provides movement of the camera mount 20 to its second position, illustrated herein, wherein the camera mount 20 has at least a portion thereof extended above the roof 22 of the vehicle body 10. It is contemplated within the scope of the present invention that the camera mount 20 could have telescoping portions and extend the camera 40 to alternate heights but not to exceed a height of thirteen feet and six inches in accordance with height restrictions on public roadways.

The camera 40 is secured to the second end 31 of the camera mount 20 utilizing suitable durable techniques. The camera 40 is a conventional video camera and it is contemplated within the scope of the present invention that the camera 40 could be secured to the camera mount 20 wherein the camera 40 is movable in both a rotational and pivotal direction. The camera 40 is operably coupled to the controller 50 and display 60. The display 60 is a conventional display or screen that is operable to provide the images captured by the camera 40. The controller 50 is a conventional computing device that includes the necessary electronics to store, receive, transmit and manipulate data signals. The controller 50 provides the user interface for operation of the camera 40 and camera mount 20. It should be understood by those skilled in the art that the controller 50 could provide various controls as needed to offer the desired functionality of the camera 40. It is contemplated within the scope of the present invention that the camera 40 is operably coupled to the controller 50 utilizing either a wired or wireless technique.

Figure 2:
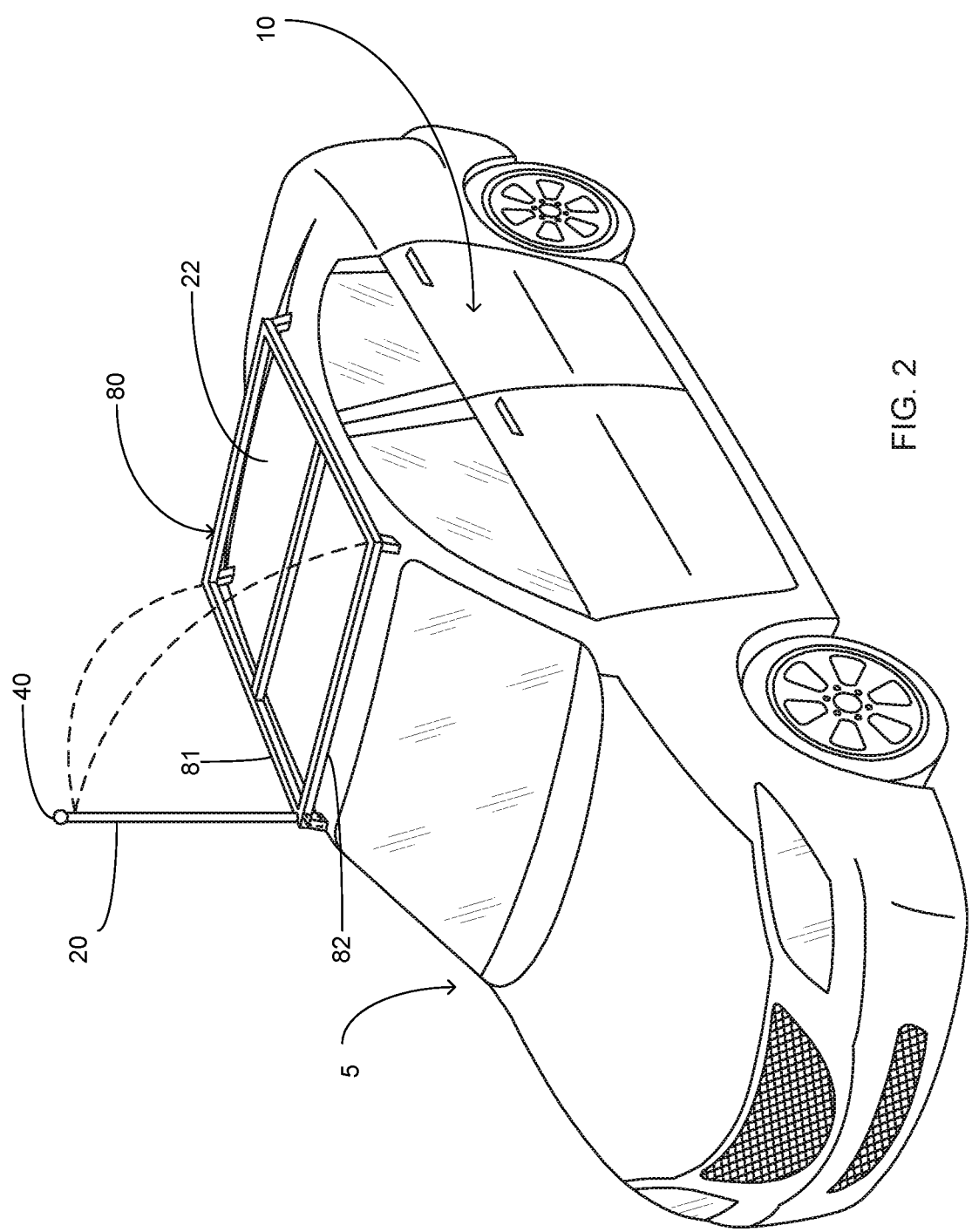
FIG. 2 is a perspective view of an alternative embodiment of the present invention.
Figure 3:
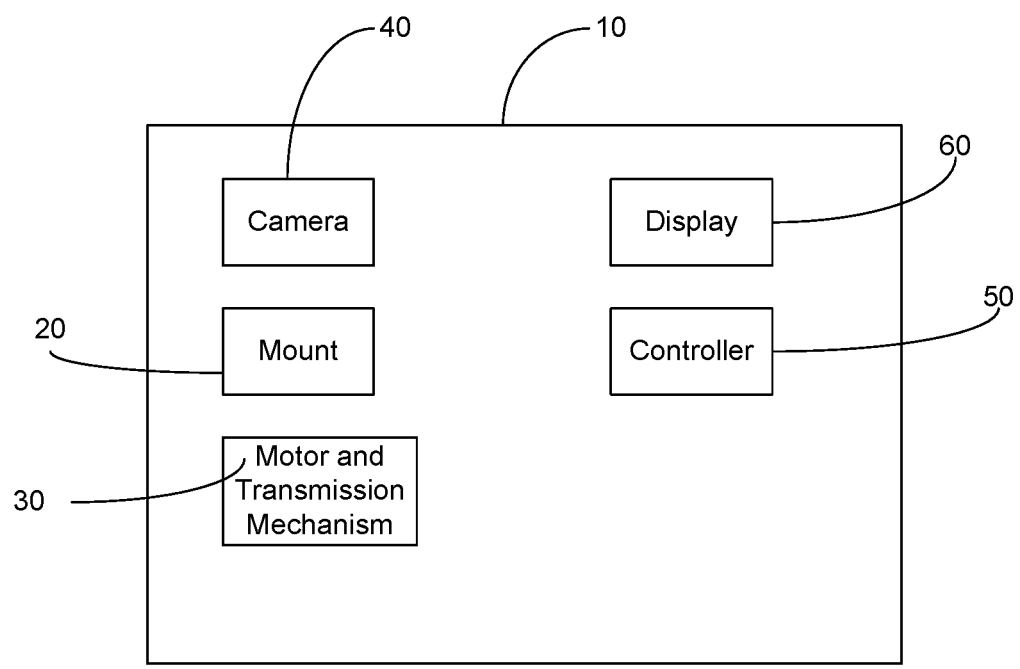
FIG. 3 is a block diagram of the operational components of the present invention.

Referring herein to FIG. 2, the vehicle with positionable video camera 100 is illustrated therein with an alternate mounting technique for the camera mount 20. In the illustrated alternative embodiment the camera mount 20 is movably mounted to a roof rack 80. The roof rack 80 is a conventional roof rack secured to the roof of the vehicle body 10 and is manufactured from a durable material such as but not limited to metal. The camera mount 20 is secured to the roof rack 80 utilizing brackets that provide a pivotal movement of the camera mount 20. The camera mount 20 in the embodiment illustrated in FIG. 2 has a first position and a second position. In the first position the camera mount 20 is adjacent and parallel to a portion 81,82 of the roof rack 80. In its second position, the camera mount 20 is positioned such that the camera mount 20 is extending outward and upward from the roof rack 80 so as to place the camera 40 in a position to provide a view for the driver of the vehicle that is from the perspective from above the roof 22 of the vehicle body 10. In absence of a roof rack on a vehicle, mount 20 is directly integrated to the vehicle roof structurally by forming a groove to fit camera 100 and mount 20 so that vehicle appearance is not affected.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle having at least one camera configured to extend beyond the vehicle body comprising:
   a vehicle body, said vehicle body having a roof;
   a camera mount, said camera mount being movably secured to said vehicle body, said camera mount having a first position and a second position;
   a drive motor, said drive motor being operably coupled to said camera mount, said drive motor configured to move said camera mount intermediate its first position and second position;
   at least one camera, said at least one camera operably coupled to said camera mount; and
   wherein in said second position of said camera mount said at least one camera is above the roof of the vehicle body.

2. The vehicle as recited in claim 1, and further including a display, said display being mounted in a passenger compartment of the vehicle.

3. The vehicle as recited in claim 2, and further including a controller, said controller operably coupled to said at least one camera, said controller configured to provide operation of the at least one camera.

4. The vehicle as recited in claim 3, wherein in said first position the camera mount is adjacent and parallel the roof of the vehicle body.

5. The vehicle as recited in claim 3, wherein in said first position the camera mount is substantially disposed within the vehicle body.

6. A vehicle having at least one camera configured to extend beyond the vehicle body comprising:
   a vehicle body, said vehicle body having a roof;
   a mounting channel, said mounting channel being formed in said vehicle body, said mounting channel having a first end and a second end, said mounting channel having an interior volume, said mounting channel having an opening with moisture seal proximate said second end providing access to said interior volume;
   a camera mount, said camera mount being movably secured within said mounting channel, said camera mount having a first end and a second end, said camera mount having a first position and a second position;
   a drive motor, said drive motor being operably coupled to said camera mount, said drive motor configured to move said camera mount intermediate its first position and second position;
   at least one camera, said at least one camera operably coupled to said camera mount; and
   wherein in said second position of said camera mount said at least one camera is above the roof of the vehicle body.

7. The vehicle as recited in claim 6, and further including a controller, said controller operably coupled to said at least one camera, said controller configured to provide operation of the at least one camera.

8. The vehicle as recited in claim 7, and further including a display, said display being mounted in a passenger compartment of the vehicle, said display configured to display images captured by said at least one controller.

9. The vehicle as recited in claim 8, wherein said at least one camera is rotatably secured to said camera mount.

10. The vehicle as recited in claim 8, wherein said at least one camera is pivotally secured to said camera mount.

11. The vehicle as recited in claim 8, wherein said at least one camera is extendible to a height of up to thirteen feet and six inches.

12. A vehicle having at least one camera configured to provide an improved view for a driver thereof comprising:
   a vehicle body, said vehicle body having a roof or a roof rack secured thereto;
   a camera mount, said camera mount being movably secured to said roof or roof rack, said camera mount having a first end and a second end, said camera mount having a first position and a second position, said first end of said camera mount being pivotally secured to said roof or roof rack;
   a drive motor and mechanism, said drive motor being operably coupled to said camera mount, said drive motor and mechanism configured to move said camera mount intermediate its first position and second position;
   at least one camera, said at least one camera operably coupled to said second end of said camera mount;
   a controller, said controller operably coupled to said at least one camera, said controller configured to provide operation of the at least one camera;
   a display, said display being mounted in a passenger compartment of the vehicle, said display configured to display images captured by said at least one controller; and
   wherein in said second position of said camera mount said at least one camera is above the roof of the vehicle body.

13. The vehicle as recited in claim 12, wherein in said first position said camera mount is adjacent said roof or roof rack and parallel thereto.

14. The vehicle as recited in claim 12, wherein in said second position said camera mount is extending upward from said roof or roof rack and perpendicular thereto.

15. The vehicle as recited in claim 14, wherein said at least one camera is rotatably secured to said camera mount.

16. The vehicle as recited in claim 14, wherein said at least one camera is pivotally secured to said camera mount.

* * * * *